United States Patent
Kester et al.

(10) Patent No.: US 12,444,921 B2
(45) Date of Patent: Oct. 14, 2025

(54) INTERRUPTER DEVICE FOR SURGE ARRESTER

(71) Applicant: HITACHI ENERGY LTD, Zürich (CH)

(72) Inventors: Jeffrey Joseph Kester, Bemus Point, NY (US); Remo Mugwyler, Pittsburgh, PA (US)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 17/016,163

(22) Filed: Sep. 9, 2020

(65) Prior Publication Data

US 2022/0077673 A1  Mar. 10, 2022

(51) Int. Cl.
| | |
|---|---|
| *H02H 3/20* | (2006.01) |
| *H01H 71/02* | (2006.01) |
| *H01H 71/08* | (2006.01) |
| *H01H 71/12* | (2006.01) |

(52) U.S. Cl.
CPC .............. *H02H 3/20* (2013.01); *H01H 71/02* (2013.01); *H01H 71/08* (2013.01); *H01H 71/12* (2013.01)

(58) Field of Classification Search
CPC .......... H02H 3/20; H01H 71/02; H01H 71/08; H01H 71/12; H01H 39/002; H01T 1/14
USPC ....................................................... 361/91.5
See application file for complete search history.

(56) References Cited

U.S. PATENT DOCUMENTS

| | | | |
|---|---|---|---|
| 2,989,608 A | * | 6/1961 | Hicks ........................ H01T 1/14 337/279 |
| 4,471,402 A |   | 9/1984 | Cunningham |
| 4,503,414 A |   | 3/1985 | Sykes et al. |
| 4,609,902 A |   | 9/1986 | Lenk |
| 4,734,823 A | * | 3/1988 | Cunningham ......... H01H 39/00 361/131 |
| 5,057,810 A | * | 10/1991 | Raudabaugh ............. H01T 1/14 361/124 |
| 5,113,167 A |   | 5/1992 | Raudabaugh |
| 5,237,482 A | * | 8/1993 | Osterhout ................. H01T 1/14 361/127 |
| 5,434,550 A |   | 7/1995 | Putt |

(Continued)

FOREIGN PATENT DOCUMENTS

| | | | | |
|---|---|---|---|---|
| CN | 106165048 A |   | 11/2016 | |
| EP | 2278605 A1 | * | 1/2011 | ............. H02H 9/042 |

(Continued)

OTHER PUBLICATIONS

International Search Report and Written Opinion of the International Searching Authority, PCT/EP2021/074854, mailed Dec. 21, 2021, 14 pages.

(Continued)

*Primary Examiner* — Sreeya Sreevatsa
(74) *Attorney, Agent, or Firm* — Sage Patent Group

(57) ABSTRACT

An interrupter device provides overload protection. The device includes a first terminal that is configured to establish an electrical connection to a first terminal of a high voltage surge arrester, a second terminal that is configured to establish an electrical connection to an electrical power grid line side conductor, and a chargeless disconnection trigger that causes an interruption in an electrically conductive path between the first and second terminal in response to an overload condition at the second terminal.

24 Claims, 9 Drawing Sheets

(56) References Cited

U.S. PATENT DOCUMENTS

| | | | |
|---|---|---|---|
| 5,952,910 A | 9/1999 | Krause | |
| 5,991,141 A * | 11/1999 | Mikli | H01C 7/12 |
| | | | 361/127 |
| 7,573,692 B1 | 8/2009 | Weeks et al. | |
| 7,675,728 B2 | 3/2010 | Woodworth | |
| 9,755,420 B2 * | 9/2017 | Smith | H01H 33/00 |
| 2003/0210508 A1 * | 11/2003 | Zeller | H01T 1/12 |
| | | | 361/115 |
| 2015/0103462 A1 | 4/2015 | Depping | |
| 2018/0076617 A1 * | 3/2018 | Boese | H02H 9/06 |

FOREIGN PATENT DOCUMENTS

| | | |
|---|---|---|
| WO | WO 2017/148544 A1 | 9/2017 |
| WO | WO 2018/050204 A1 | 3/2018 |

OTHER PUBLICATIONS

United States Office Action, U.S. Appl. No. 18/023,840, mailed Apr. 8, 2025, 19 pages.
Chinese Office Action, Chinese Patent Application No. 202180061909.6, mailed May 9, 2025, 7 pages.

* cited by examiner

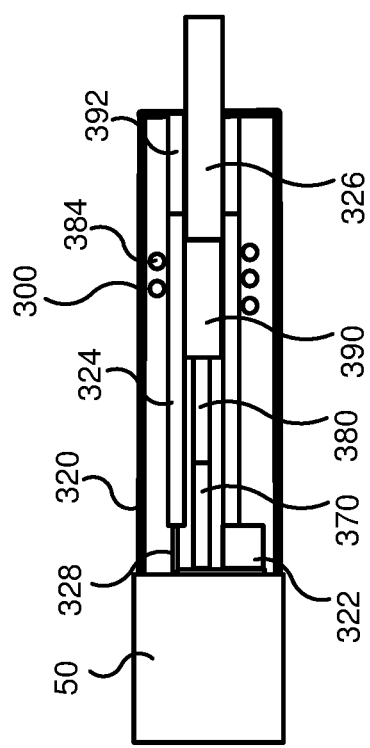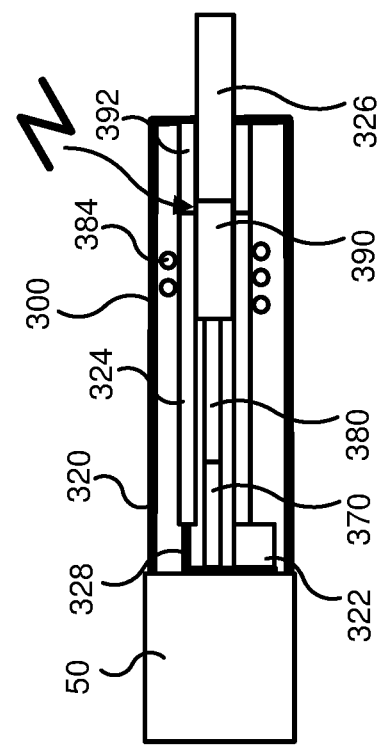

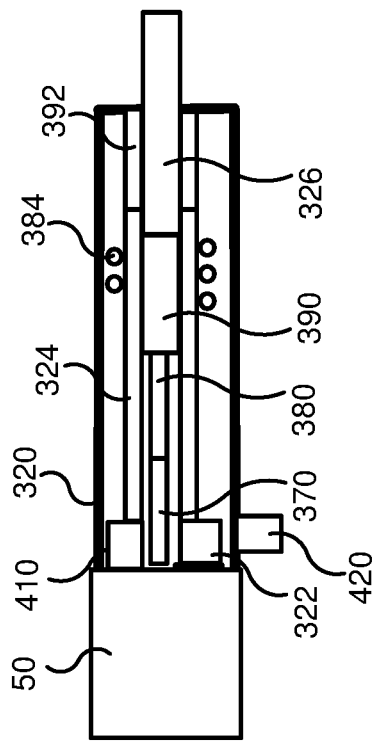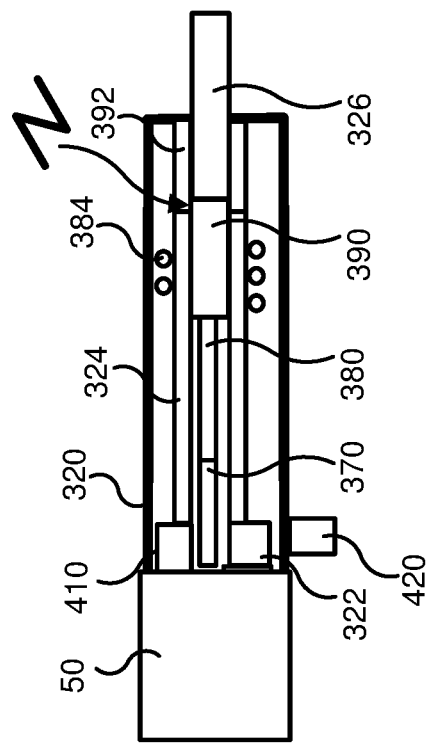

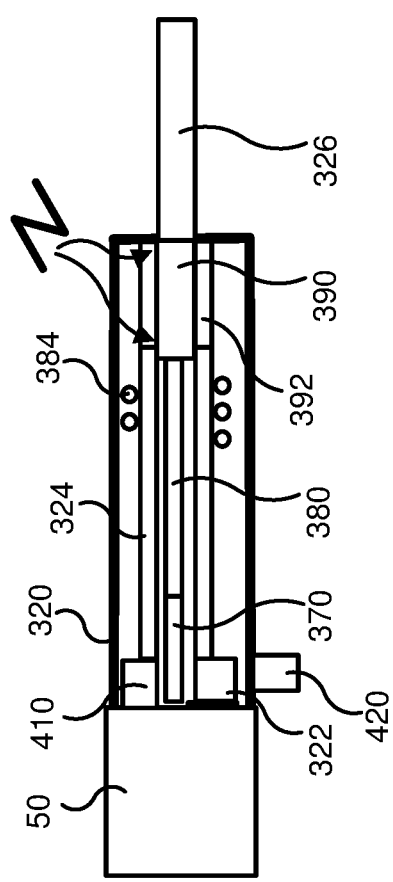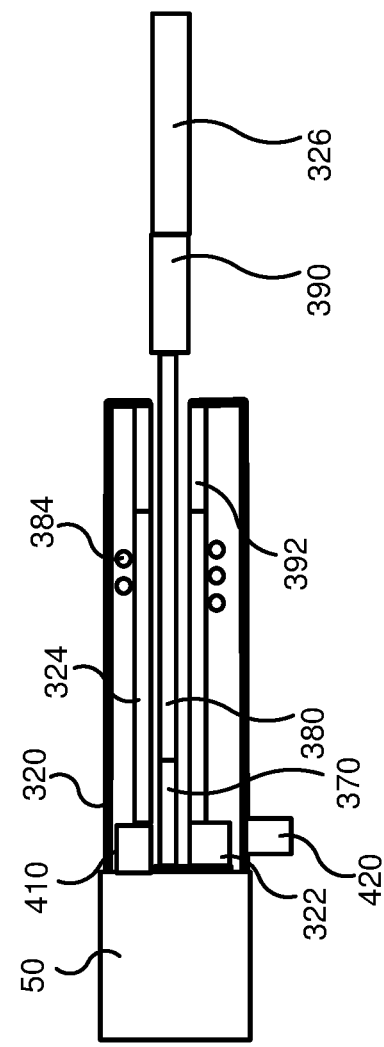

INTERRUPTER DEVICE FOR SURGE ARRESTER

BACKGROUND

Lightning or surge arresters are typically connected to power lines to carry electrical surge currents to ground. In this manner, damage to lines and equipment connected close to the arresters may be reduced and/or prevented. During normal system voltage across power lines, arresters have very high resistance and function equivalent to insulators. As system disturbances occur, such as direct and/or indirect lightning surges, switching surges or voltages rise the arresters reach a threshold voltage where the resistance becomes very small and surge currents are conducted to ground through the arrester thus clamping and limiting voltage rise on the system. Examples of common system disturbances include lightning strikes, switching surge currents and temporary over voltages, which can occur from various fault conditions ranging from system insulation failure to tree branches causing a high impedance connection to ground. Typical practice is to use surge arresters to protect system components from dangerous transient over-voltage conditions.

After the surge, the voltage drops and the arrester normally returns to a high resistance state. However, upon arrester overload or malfunction, the high resistance state may not be resumed and the arrester may continue to provide an electrical path from the power line to ground. Ultimately, the arrester will fail as currents evolve into a short circuit condition as the metal oxide varistor elements heat up and the arrester will require replacement. To avoid line lockout, disconnector assemblies are commonly used in conjunction with arresters to separate a malfunctioning arrester from the circuit and to provide a visual indication of arrester failure. Arrester disconnectors are designed to separate the line or ground lead from the failing arrester thus providing visible indication the arrester is isolated from the system. As the disconnector operates and the terminal lead moves away from the arrester, an arc is drawn until the separation distance is large enough to interrupt or more likely until an upstream device has cleared the circuit either through a temporary interruption as a reclosure attempts to clear the fault, or through a circuit interruption, which may occur if a recloser locks out, a fuse melts, and/or a sectionalizer opens the circuit after multiple recloser fault clearing attempts.

With increased reliance on modern technology, system reliability may be increasingly important. Momentary interruptions causing lights to flicker can also cause damage or disruption to sensitive power loads. Also, there may be significant cost for utilities to send out line crews for power restoration efforts. A crew must find the point of system interruption by over current protection equipment such as, for example, fused cut outs, sectionalizers, and/or reclosers. Then, if the arrester has remained shorted based on the arrester disconnector failing to completely separate, the crew must clear the arrester fault and then reset the tripped overcurrent device.

Conventional disconnector assemblies may include an explosive charge to destroy the circuit path and physically separate the electrical terminals. Examples of such disconnector assemblies are disclosed in U.S. Pat. App. Pub. No. US 2018/0076617 to Boese, U.S. Pat. No. 7,675,728 to Woodworth, U.S. Pat. No. 5,952,910 to Krause and U.S. Pat. Nos. 5,057,810 and 5,113,167 to Raudabaugh, as well as U.S. Pat. No. 5,434,550 to Putt, U.S. Pat. No. 4,471,402 to Cunningham, U.S. Pat. No. 4,609,902 to Lenk, and the subject matter of each of which are hereby incorporated by reference. Traditionally, polymer-housed distribution class arresters may be assembled with an insulating bracket that physically supports the arrester and that isolates the ground end of the arrester from the system ground in the event of arrester failure. A ground lead disconnector connects the ground end of the disconnector to the system neutral or ground wire. In normal service conditions, the arrester grading current flows through the arrester, disconnector and to ground. If the arrester fails, the arrester 60 Hz fault current flows through the failed arrester and disconnector, which causes the disconnector to operate. The disconnector physically disconnects the ground lead from the arrester, thereby effectively isolating the failed arrester from ground after triggering system overcurrent protection and clearing the arrester fault. Separating the arrester ground allows the utility to restore service to its customers after clearing the fault. If the disconnector operation is cleared through a reclosure operation, only a momentary interruption may occur. If a fuse or sectionalizer operates, or the recloser locks out, the system must be restored.

Existing disconnectors typically have a grading component in parallel with a spark gap. The grading component and spark gap are located close to a detonating device, such as an unprimed cartridge. The grading component conducts the arrester grading current under normal service conditions. If arrester failure occurs, the leakage current increases from a few milliamperes to amperes or thousands of amperes, depending on the utility system grounding at the arrester location. This current flow through the arrester and disconnector causes voltage to develop across the disconnector grading component. When voltage reaches a predetermined level, the parallel spark gap sparks over, protecting the grading components and causing heat build-up on the cartridge. Control of the spark gap and grading coordination properties may be problematic and may change over time, thus affecting the predictability of disconnecting properties.

Based on the heat build-up in the cartridge, the cartridge then detonates and separates the ground lead connection. Typically, the grading component is a combination of resistance, capacitance and inductance providing an equivalent circuit impedance which results in a portion of the voltage across the spark gap. When over voltage events occur on the system, voltage rises across the arrester such that it reaches conduction, then voltage rises in the grading circuit causing the bypass spark gap to flashover. Only when the current or time of the event is high enough, will the cartridge ignite and cause separation to occur.

As modern metal oxide varistors used in arresters do not demonstrate aging phenomena if the encapsulating insulation system remains effective, the arrester life span may be very long. Typically an arrester may only be removed or replaced when the capital equipment that the arrester is protecting is being replaced. Arresters commonly remain installed for several decades. It is common for service life to exceed 40-50 years. This long service life presents an additional complication as the explosive cartridges age and begin to change within 5 years of manufacture. Explosives manufacturers do not recommend use beyond 10 years and the potential exists for disconnectors to become unreliable much earlier in life than the arrester. If the disconnector fails to separate, the system cannot be restored until a utility crew has found and removed the shorted arrester. For improved system reliability, a need exists to replace the conventional arrester disconnector with fast interrupting assemblies.

SUMMARY

Some embodiments herein are directed to an interrupter device to provide a temporary overvoltage protection. The device may include a first terminal that is configured to establish an electrical connection to a first terminal of a high voltage surge arrester, a second terminal that is configured to establish an electrical connection to an electrical power grid line side conductor, and a chargeless disconnection trigger that causes an interruption in an electrically conductive path between the second terminal and the first terminal in response to an overvoltage condition at the second terminal.

In some embodiments, the high voltage surge arrester includes a second terminal that is configured to establish an electrical connection to a ground connection.

In some embodiments, the chargeless disconnection trigger includes a first spark gap electrode that includes a first proximal portion that is conductively engaged with the first terminal of the interrupter device and a first distal portion that is opposite the first proximal portion. The trigger may include a second spark gap electrode that includes a second proximal portion that is conductively engaged with the second terminal of the interrupter device and a second distal portion that is opposite the second proximal portion. Some embodiments provide that the first distal portion and the second distal portion are spaced apart to form a spark gap therebetween.

The trigger may include a grading component that includes a current path from the first terminal to the second terminal and that provides increasing electrical resistance responsive to an increase in the rate of change of current therethrough and a gas generating structure that is configured to generate an arc quenching material. In some embodiments, the grading component includes an inductive grading component and a fuse link that is connected in series with the inductive grading component. Some embodiments provide that the gas generating structure includes boric acid and is configured to be arranged around the spark gap and/or the grading component.

While some embodiments are directed to grading options including resistive and inductive grading, some embodiments include any combination of R-L-C. Such embodiments may provide that grading options are expressed in terms of impedance. Such embodiments include linear and non-linear approaches. For example, in some embodiments, managing the impedance may be in concert with spark gap design and a precision gap may be more important than linearity as a function of available options.

Some embodiments include a housing that defines a cavity that is configured to include the chargeless disconnection trigger. In some embodiments, the first terminal of the interrupter device includes a first end of an elongated conductor and the second terminal of the interrupter device includes a second end of the elongated conductor that is opposite the first terminal. Some embodiments provide that the chargeless disconnection trigger includes a conductive component that is electrically coupled between the first terminal of the high voltage surge arrester and a solder joint that conductively couples the conductive component to the first terminal of the interrupter device and a flexible insulator sleeve that includes a first insulator end that corresponds to the solder joint and that is movable relative to the housing and a second insulator end that is attached to the housing. In some embodiments, the first insulator end of the flexible insulator sleeve is closed and the second insulator end of the flexible insulator sleeve is open.

Some embodiments provide that the chargeless disconnection trigger further includes a gas generating structure that is in the cavity of the housing between the first terminal of a high voltage surge arrester and the first insulator end of the sleeve and is configured to generate an arc quenching material. In some embodiments, responsive to pressure corresponding to the gas being generated by the gas generating structure, a disconnecting force is applied to the first insulator end of the flexible insulator sleeve and the first terminal of the interrupter device.

In some embodiments, responsive to the disconnecting force being applied to the first insulator end of the flexible insulator sleeve, the elongated conductor that includes the first and second terminals is propelled out of the cavity of the housing. In some embodiments, the flexible insulator sleeve includes silicone and the gas generating structure includes boric acid. Some embodiments provide that the flexible insulator sleeve includes an elastic property and applies a biasing force onto the elongated conductor that includes the first and second terminals. Some embodiments provide that, responsive to the solder reaching a melting temperature based on an electrical surge current, the solder is configured to change to a liquid state and release the conductive connection to the first terminal of the interrupter device. In some embodiments, in response to the conductive connection being released from the first terminal of the interrupter device, the biasing force of the flexible insulator sleeve is configured to cause the elongated conductor to move to an ejected position that is out of the cavity of the housing.

Some embodiments provide that a long shaft includes the elongated conductor and an insulating section. In an operating position, the elongated conductor is positioned to complete the circuit. During operation, the insulative sections, such as, teflon class materials, may separate and isolate the conductive shaft portion thereby stretching the arc for interruption.

Some embodiments are directed to an interrupter device that includes an insulating housing that is elongated and that defines a cavity that includes a first housing end that is adjacent a surge arrester terminal and a second housing end that is opposite the first housing end. In some embodiments, a fixed conductive component is positioned within the cavity between the first housing end and the second housing end, a first terminal is configured to establish an electrical connection to the surge arrester terminal, and a second terminal is configured to establish an electrical connection to an electrical power grid conductor and is conductively coupled to the fixed conductive component in a first position and is not conductively coupled to the fixed conductive component in a second position that is different from the first position. Some embodiments include a chargeless disconnection trigger that causes an interruption in an electrically conductive path between the first terminal and the second terminal in response to an overvoltage condition at the second terminal.

In some embodiments, the chargeless disconnection trigger includes an energy storage component that, responsive to the overvoltage condition, causes the second terminal to move from the first position to the second position.

In some embodiments, the second terminal is outside the cavity in the second position.

Some embodiments include a fixed insulating sleeve that extends from the fixed conductive component and towards the second housing end and that includes an inner surface that movably contacts an outer surface of the second terminal. Some embodiments include a movable insulator that contacts an inner surface of the fixed conductive component responsive to the second terminal being in the first position and that contacts an end of the second terminal.

In some embodiments, the movable insulator is outside the cavity of the housing responsive to the second terminal being in the second position. In some embodiments, the chargeless disconnection trigger includes a gap grading device that is between the fixed conductive component and the surge arrester terminal. Some embodiments provide that the chargeless disconnection trigger further includes a solid-state switching device that is configured to cause the interruption in the electrically conductive path between the first terminal and the second terminal.

In some embodiments, the solid-state switching device includes a power Mosfet that is configured to disconnect the electrically conductive path prior to device failure and reconnect the electrically conductive path after recovery.

Some embodiments include a communications module that is configured to wirelessly transmit state data corresponding to a state of the device, wherein the state of the device includes a conducting state and a non-conducting state.

In some embodiments, the communications module is further configured to communicate associated time, date, and/or device identification data that corresponds to the state data.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 5A-5D are schematic block diagrams illustrating cut-away cross-sectional views of an interrupter device in different respective positions from a conducting and a non-conducting state, respectively, according to some embodiments.

FIGS. 6A-6D are schematic block diagrams illustrating cut-away cross-sectional views of an interrupter device in different respective positions from a conducting and a non-conducting state, respectively, according to some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
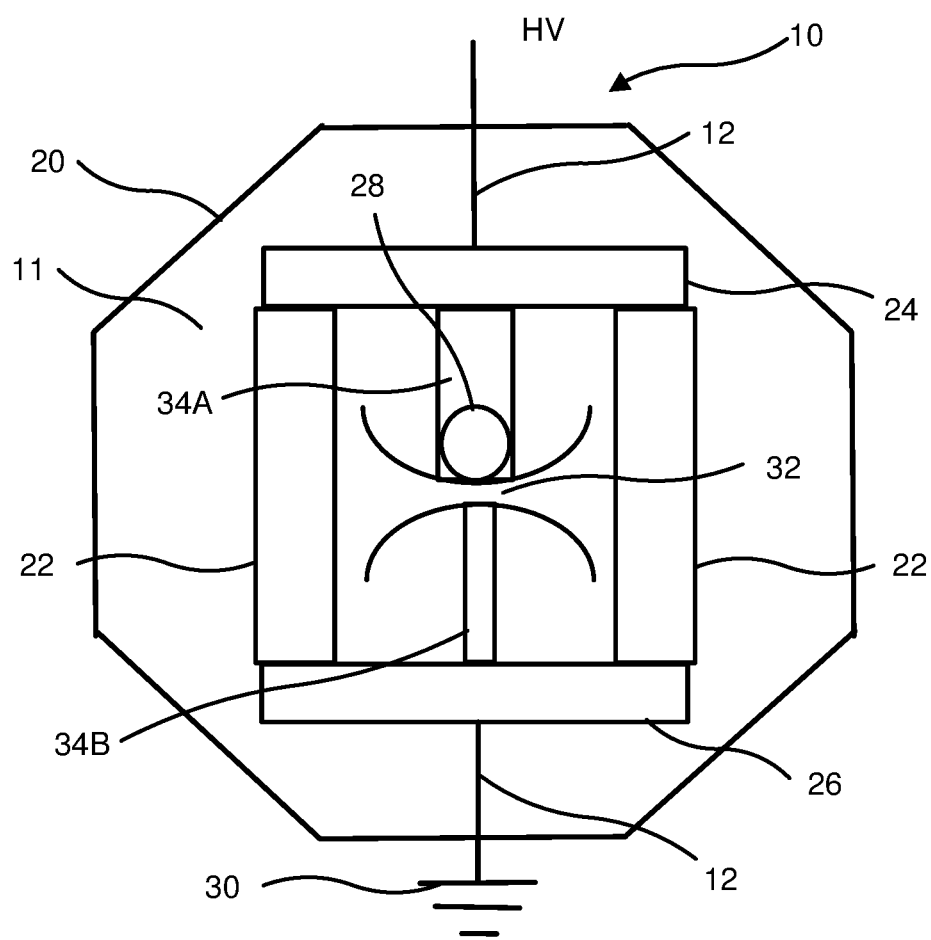
FIG. 1 is a schematic block diagram illustrating a cut-away cross-sectional view of an arrester disconnector that includes a charge, grading component, and spark gap.

Reference is now made to FIG. 1, which is a schematic block diagram illustrating a cut-away cross-sectional view of a disconnector device 10 for an arrester. The device 10 includes a housing 20 that defines a cavity 11 and includes a conduction path 12 that may conductively couple a current carrying conductor (HV) and a ground connection 30.

The cavity 11, as defined by the inner wall of the housing 20, may have different cross sections such as a circle, a triangle, a square, a rectangle, a pentagon, a hexagon, heptagon, octagon, in general referred to as a polygon in this document. Embodiments of the device 10 may provide that the cross-sectional shape of the cavity 11 may include a polygonal shape to prevent inner components from rotating about the longitudinal axis. As a result, components in the device 10 may be protected from being torn apart unintentionally by mechanical torsion.

The device 10 may include a first terminal 24 that may be referred to as a source terminal and that is conductively coupled to the current carrying conductor HV. As provided herein, the current carrying conductor HV may be an energized power line or a neutral power line, such as in an electrical distribution system and/or a power grid component, among others. The device 10 may further include a second terminal 26 that may be referred to as a ground terminal and that is conductively coupled to the ground connection 30. Although some examples herein describe the specific coupling points of the terminals of the device, embodiments herein may provide that the first terminal 24 is an arrester connection and the second terminal 26 may be a circuit connection. As such, some embodiments provide disconnection of the failing arrester from a power source, a neutral and/or a grounding point.

A first spark gap electrode 34A may be conductively coupled to the first terminal 24 and a second spark gap electrode 34B may be conductively coupled to the second terminal 26. The first and second spark gap electrodes 34A, 34B are arranged to form a spark gap 32.

The device 10 may also include a grading ring 22 that may be connected between the first terminal 24 and the second terminal 26. In some embodiments, the grading ring 22 may provide a nonlinear voltage rise across the spark gap 32. Once the voltage across the spark gap 32 reaches a voltage threshold, a spark may be generated between the first and second spark gap electrodes 34A, 34B. Although some embodiments are directed to a grading ring 22, such embodiments are non-limiting and may include a grading component having a geometry other than a ring. The grading component may be configured in the circuit to establish voltage across the gap.

The device 10 may include an explosive cartridge 28 at the first or second spark gap electrode 34A, 34B. Once the spark is generated, the explosive cartridge 28 is configured to break apart based on developing hot gases and cause the first and/or second spark gap electrode 34A, 34B to break apart, thus interrupting the current path therebetween. In contrast with conventional methods, embodiments disclosed herein provide a precisely controlled circuit that results in an interruption concurrent with or prior to a conventional disconnection. In this manner, embodiments herein may provide we will configure a more precisely controlled circuit that results in interruption in contrast to existing disconnection.

Figure 2A:
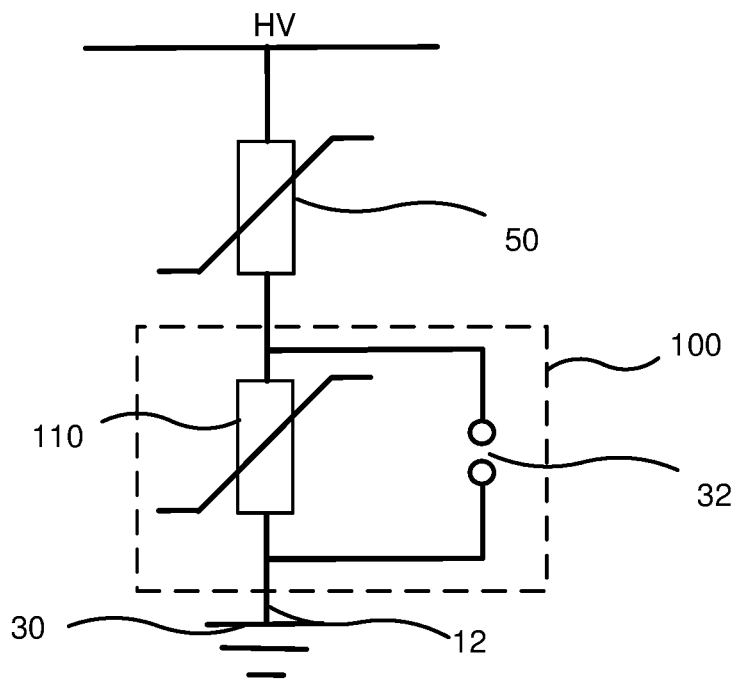
FIGS. 2A and 2B are schematic circuit diagrams illustrating an arrester and disconnector coupled to a power grid according to some embodiments.
Figure 2B:
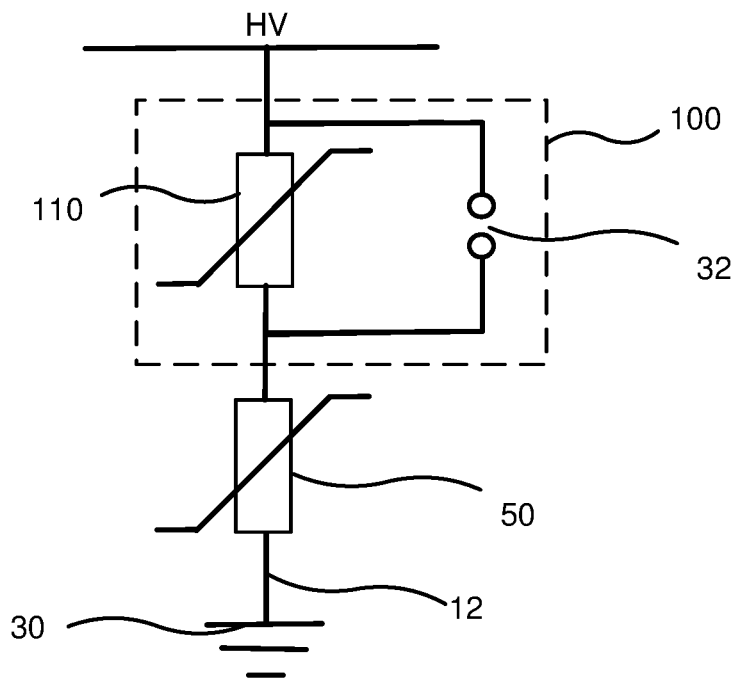

Reference is now made to FIGS. 2A and 2B, which are schematic circuit diagrams illustrating an arrester, such as a surge arrester, and disconnector coupled to a power grid according to some embodiments. The circuit diagram of an overvoltage protection assembly connected to an electrical grid line 12 and to ground potential 30 is shown and explained with respect to FIGS. 2A and 2B. Referring to FIG. 2A, an arrester 50 is electrically connected to the electrical grid line 12 and to a first terminal of an interrupter device 100 at its other terminal. The interrupter device 100 is indicated by the dashed box in FIG. 2A. As illustrated, the interrupter device 100 may optionally include a spark gap 32 that is electrically connected in parallel to other interrupter components 110 therein. The surge arrester 50 may be of a known type such that the primary discussion corresponds to the interrupter devices disclosed herein.

Although some examples herein describe the specific coupling points of the terminals of the device, embodiments herein may provide that the first terminal is an arrester connection and the second terminal may be a circuit connection. As such, some embodiments provide disconnection of the failing arrester from a power source, a neutral and/or a grounding point.

Briefly referring to FIG. 2B, the interrupter device 100 is coupled to the electrical grid line 12 and the arrester 50 is coupled to the ground potential 30. As provided herein, some embodiments are directed at interrupting or separating the arrester to line circuit before reaching a low impedance fault, which would constitute conducting full available fault current. For instance, depending on grounding and source conditions, available currents could range from 1 A to 80,000 A. In some embodiments, available currents may be in the range of 500 A-20,000 A. Some embodiments provide that currents may be in the range of about 500 A-10,000 A. Embodiments herein are directed at interrupting the arrester to ground portion of the circuit when currents through the arrester are less than say 10 A and in some cases less than about 1 A. In this manner, the arrester impedance may still be usable to limit arc energy during disconnection. In some embodiments, providing the circuit interruption on the HV line side may provide that the arrester would still provide impedance that limits available current during the interruption event even if the arrester shorts to a ground plane anywhere between the HV terminal and the ground terminal. If the interrupter is on the ground side and the failure finds ground before the interrupter, the arrester may not become separated from the circuit. In contrast, conventional disconnectors, may generally provide visual separation and rely on overcurrent protective devices to clear the arc and electrically isolate the arrester.

Reclosers may be set to make temporary interruptions to allow temporary fault conditions to clear. They will typically have 2 attempts to clear and then on the 3$^{rd}$ attempt lock out the entire circuit. According to embodiments herein, the conductive path is interrupted, and the arrester is separated without causing the power quality issue of a blink on the system and/or a lock-out.

According to some embodiments, the term overload may be directed to a temporary over voltage that is apparent to the arrester, in contrast with as applied to a power distribution system. For example, a TOV may be related to a system condition and/or be related to the failure of one of the series of metal oxide varistor components that may include MOV elements such as MOV disks and/or MOV blocks, among others. If a portion of a MOV element or a portion of the MOV block stack fails do to surge such as a lightning event, an energy event due to an equipment failure, and/or an energy event on a distribution system, such as a switching surge, the remaining MOV elements are now required to carry the whole system AC voltage, which may appear as an overload or apparent TOV to the arrester. Embodiments herein are directed at interrupting or separating the arrester from the system before the overload or apparent TOV fails the arrester and therefore becomes a short circuit.

As provided herein, embodiments are configured to interrupt the arrester circuit prior to the development of full system fault current conditions. The arrester disconnector is replaced with a device that interrupts the arrester conduction path to line or ground before upstream overcurrent protection devices are affected and involved. In this way, no power quality issues are caused, and the system is not impacted if an arrester has failed.

Embodiments herein provide that when the interrupter is applied to the HV side, as shown in FIG. 2A, if the arrestor failure progression results in a short that is in MOVs that are coupled to a nearby ground, the interrupter may still operate. Embodiments herein provide that when the interrupter is applied to the ground side, as shown in FIG. 2B, the interrupted may be essentially bypassed.

Figure 3:
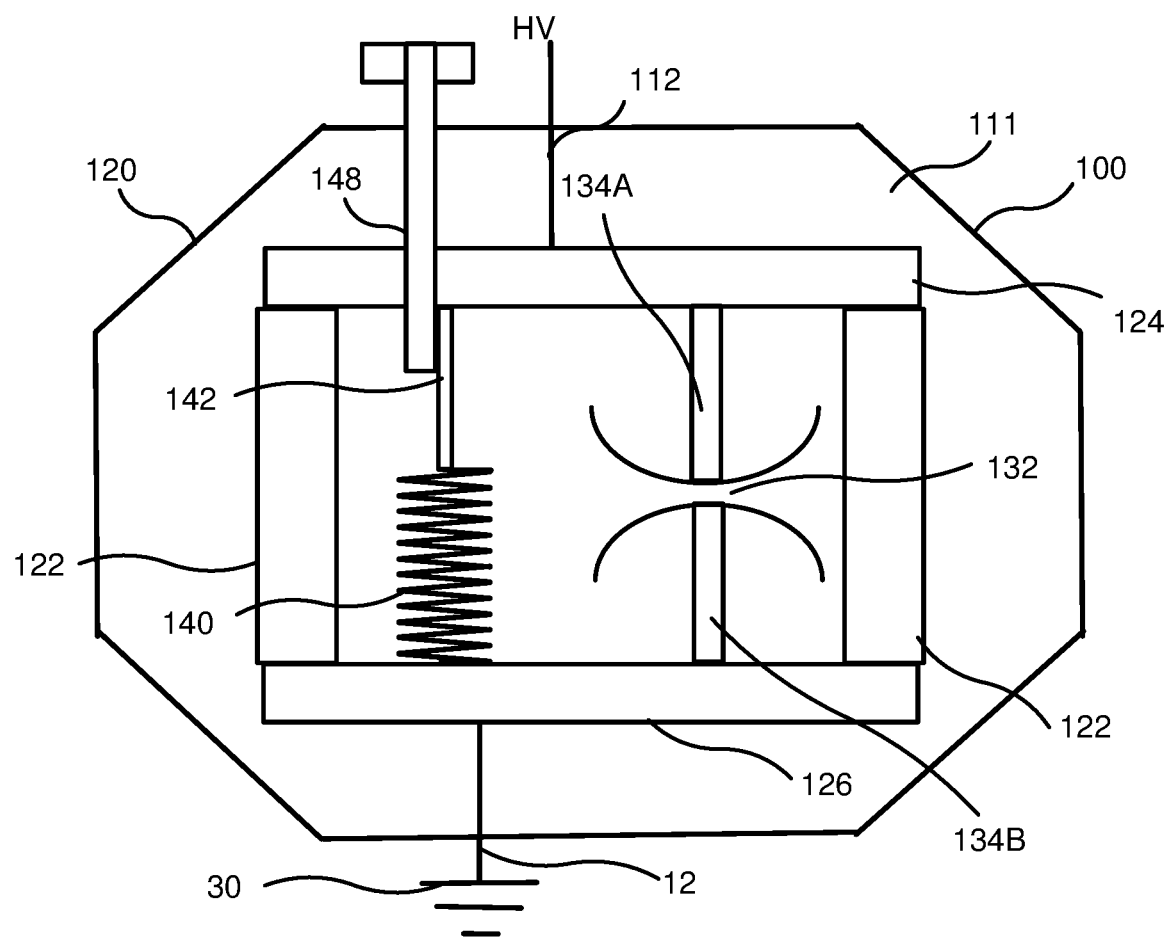
FIG. 3 is a schematic block diagram illustrating a cut-away cross-sectional view of a chargeless interrupter that includes a spark gap according to some embodiments.

Reference is now made to FIG. 3, which is a schematic block diagram illustrating a cut-away cross-sectional view of a chargeless interrupter that includes a spark gap according to some embodiments. The chargeless interrupter device 100 includes a housing 120 that defines a cavity 111 and includes a conduction path 112 that may conductively couple a current carrying conductor (HV) and a ground connection 30.

Although examples herein may be described in terms of a current carrying conductor (HV) and a ground connection 30, such descriptions are non-limiting as the conduction path may be between conductors at first and second voltages relative to ground and that are different from one another.

The cavity 111, as defined by the inner wall of the housing 120, may have different cross-sectional shapes such as a circle, a triangle, a square, a rectangle, a pentagon, a hexagon, heptagon, and/or octagon, which may be generally referred to herein as a polygon. The housing 120 may include an electrically insulating material. Embodiments of the device 100 may have a cross-sectional shape of the cavity as a polygonal shape and may prevent inner components from rotating about the longitudinal axis. As a result, components may be protected from being torn apart unintentionally by mechanical torsion.

The device 100 may include a first terminal 124 that may be referred to as a source terminal and that is conductively coupled to the current carrying conductor HV. As provided herein, the current carrying conductor HV may be an energized power line or a neutral power line, such as in an electrical distribution system and/or a power grid component, among others. The device 100 may further include a second terminal 126 that may be referred to as a ground terminal and that is conductively coupled to the ground connection 30.

A first spark gap electrode 134A may be conductively coupled to the first terminal 124 and a second spark gap electrode 134B may be conductively coupled to the second terminal 126. The first and second spark gap electrodes 134A, 134B are arranged to form a spark gap 132.

In some embodiments, the device 100 includes a gas generating structure 122 that is configured to generate an arc-quenching gas responsive to an electrical arc being developed across the spark gap 132. In some embodiments, the gas generating structure 122 may include powdered metals, boric acid and/or ATH, among others. Some embodiments provide that the gas generating structure 122 is a ring of compressed materials, such as boric acid.

In some embodiments, an inductor 140 may be connected to the first terminal 124 or the second terminal 126 and to a fuse link 142 that is further connected to the other one of the first terminal 124 or the second terminal 126. In this manner, the fuse link 142 and the inductor 140 are connected in series with one another between the first and second terminals 124, 126. In combination, the fuse link 142 and the inductor 140 may be a chargeless disconnection trigger that may cause an interruption of the conduction path between the first terminal 124 and the second terminal 126. For example, an interruption may be caused when the current through the fuse link 142 causes the fuse link 142 to melt thus severing the connection from the inductor 140 and the corresponding terminal 124, 126.

In some embodiments, the inductor 140 may be a NiCr coil. Some embodiments provide that the fuse link 142 is optional and that the inductor may also serve as a fuse link to cause the connection to be severed. Some embodiments provide that inductive grading as provided herein may cause the non-linear voltage to rise across the spark gap to provide a faster shut off. In this manner, a chargeless interrupter device may be provided.

Although illustrated as primarily an inductive approach, the grading may be performed using several potential R or L or C approaches or combinations thereof within the scope and spirit of this disclosure.

Some embodiments provide that an interrupted may include a visual indicator 148 may be provided in cases in which the interruption may be provided internally to the interrupter and may be able to withstand post event voltages to have continuing isolation. In some other embodiments, the visual indicator 148 may be used in combination with the interruption operation. The visual indicator 148 may include a physical flag that may be extended outward from the interrupter housing. Some embodiments provide that the visual indicator includes a blinking light, and audio, and/or an electronic signal that may provide the indication.

Figure 7:
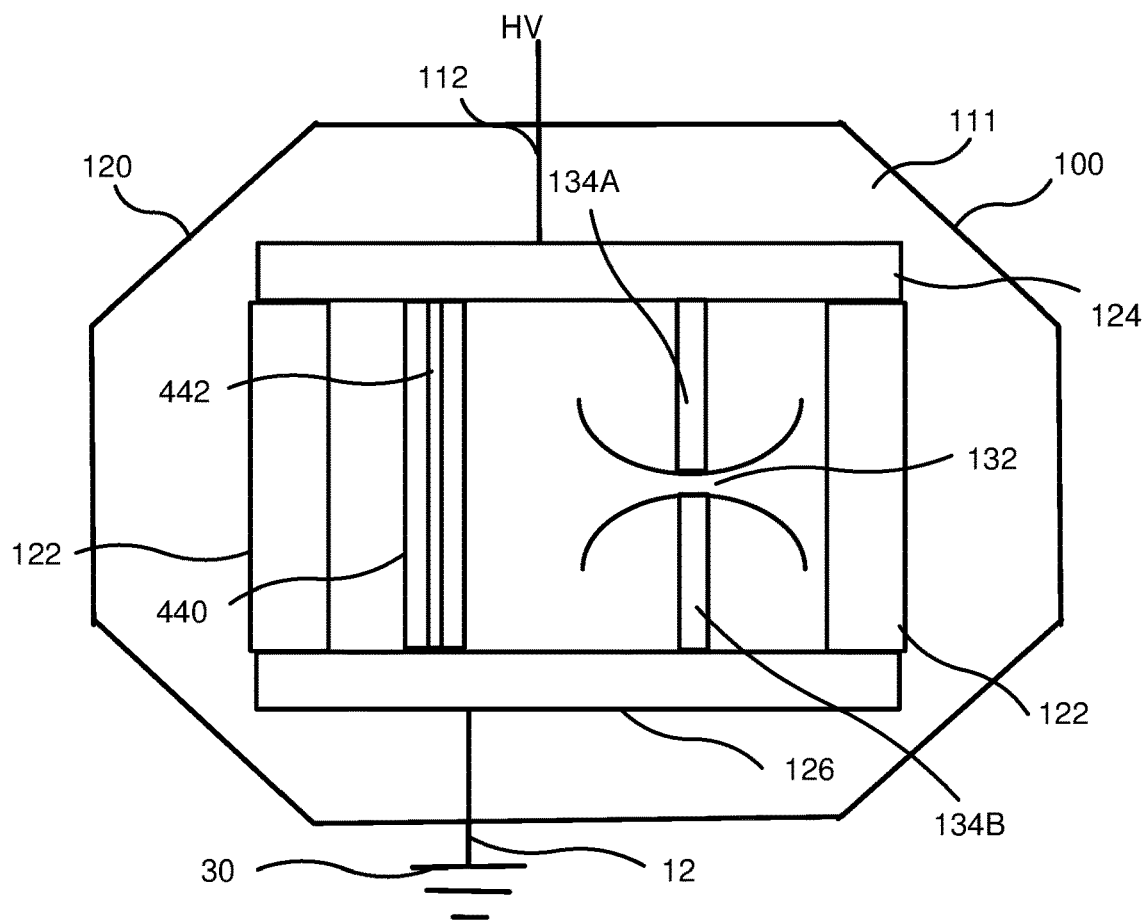
FIG. 7 is a schematic block diagram illustrating a cut-away cross-sectional view of a chargeless interrupter that includes a spark gap according to some embodiments.

Reference is now made to FIG. 7, which is a schematic block diagram illustrating a cut-away cross-sectional view of a chargeless interrupter that includes a spark gap according to some embodiments. Embodiments of FIG. 7 include several elements as discussed above regarding FIG. 3, which will not be discussed again to avoid redundancy.

In some embodiments, a fuse link 442 may be connected between the first terminal 124 and the second terminal 126. In this manner, the fuse link 442 may be a chargeless disconnection trigger that may cause an interruption of the conduction path between the first terminal 124 and the second terminal 126. For example, an interruption may be caused when the current through the fuse link 442 causes the fuse link 442 to melt thus severing the connection between terminals 124, 126. In some embodiments, the fuse link 442 may be encapsulated in an insulating sleeve 440, such as, for example, a silicone tube. In some embodiments, the length of the fuse link 442 may be sufficiently long to provide that a preferential melt of the fuse link 442 occurs at a point near the center of the fuse link 442. Although illustrated schematically as being generally linear, some embodiments provide that the fuse link 442 is configured in a coil shape to allow for additional length thereof.

As provided herein, a failing arrestor may still provide impedance to limit a fault and the arc may stretch out within the insulating sleeve 442A until it is cooled and extinguished.

Figure 4A:
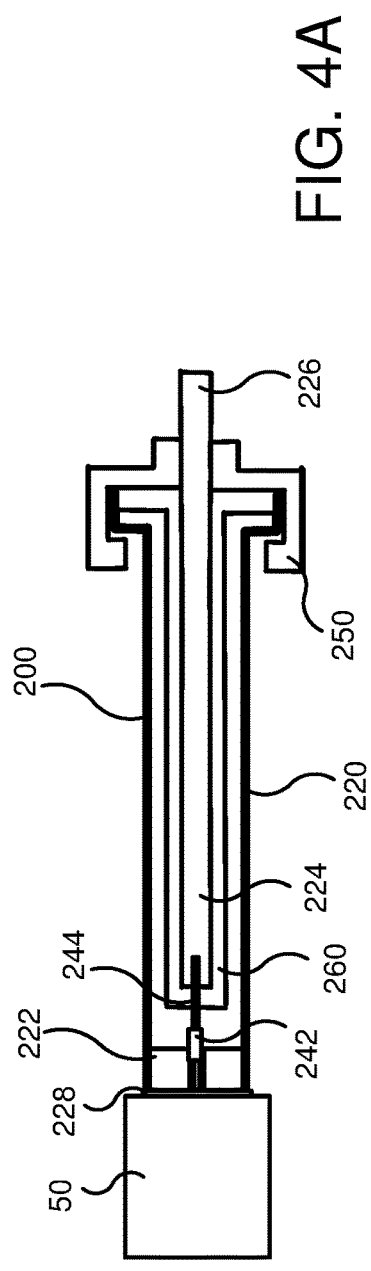
FIGS. 4A, 4B and 4C are schematic block diagrams illustrating cut-away cross-sectional views of an interrupter device in a conducting and a non-conducting state, respectively, according to some embodiments.
Figure 4B:
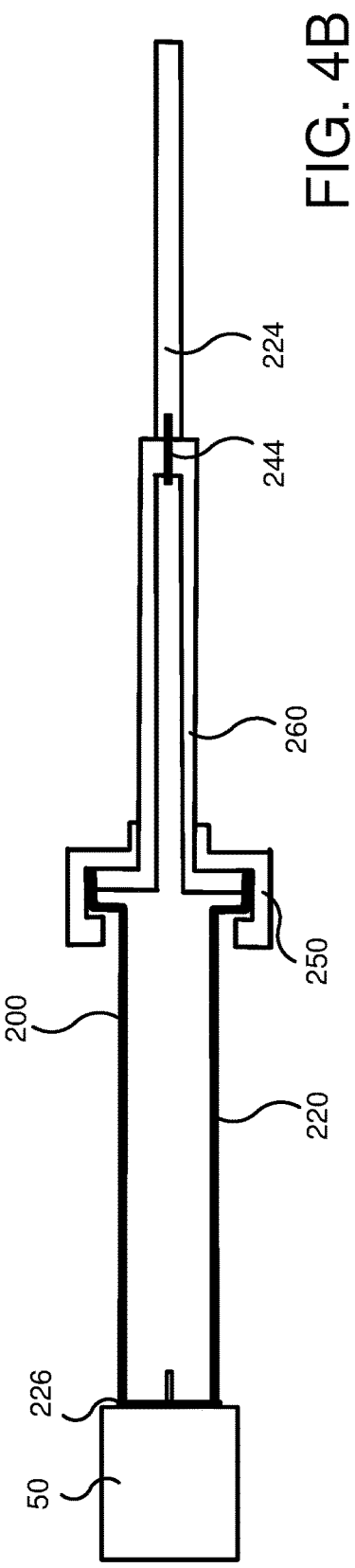
Figure 8:
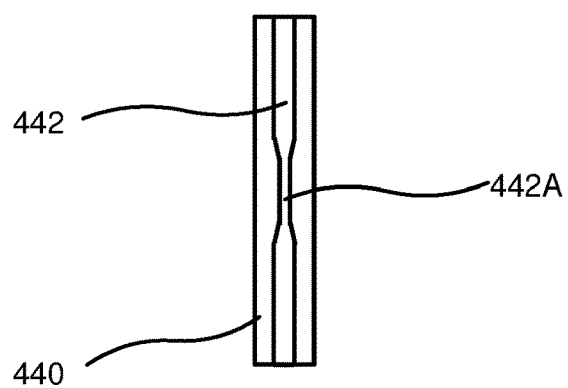
FIG. 8 is a schematic block diagram illustrating a cut-away cross-sectional view of a fuse link in a chargeless interrupter that includes a spark gap according to some embodiments.

Briefly reference is made to FIG. 8, which is a schematic block diagram illustrating a cut-away cross-sectional view of a fuse link in a chargeless interrupter that includes a spark gap according to some embodiments. As illustrated, the fuse link 442 may be encased by the insulating sleeve 440. In some embodiments, the fuse link 442 may include a designated melt portion 442A that is operable to cause the preferential melt to occur near the center of the fuse link 442. Some embodiments provide that no grading components or spark gap may be used. For example, reference is now made to FIGS. 4A, 4B and 4C, which are schematic block diagrams illustrating cut-away cross-sectional views of an interrupter device in a conducting and a non-conducting state, respectively, according to some embodiments. Reference is first made to FIG. 4A, which illustrates the device 200 in a conductive state. A chargeless interrupter device 200 may be coupled to an arrester 50. The device 200 may include a housing 220 that defines a cavity therein. The housing 220 may include an insulating material, such as, for example, a thermal set molded housing, among others.

The device 200 may include a metal connector 228 that conductively couples the arrester 50 to the device 200. In some embodiments, a gas generating structure 222 may be provided to generate an arc quenching gas. The metal connector 228 may include a soldered portion that is mechanically bound to a conductive component 244, such as, for example, a conductive ribbon or wire. For example, the metal connector 228 may be soldered to the conductive component 244 at a solder joint 242. In some embodiments, the conductive component 244 may be a ribbon that includes, for example, copper, among others.

The first terminal 224 of the device 200 may correspond to a first end of an elongated conductor and the second terminal 226 may correspond to a second end of the elongated conductor. In some embodiments, the second terminal 226 may be a terminal stud that extends from the cavity defined by the housing 220. Some embodiments provide that a flexible insulator sleeve 260 may extend from and be arranged encapsulate the first end of the elongated conductor. The conductive component 244 may pass through the end of the flexible insulator sleeve to connect to the first end of the elongated conductor 260.

The flexible insulator sleeve 260 may extend to the opposite end of the housing 220 and may be attached thereto using a crimp ring 250 or other type of mechanical fastener. In some embodiments, the crimp ring 250 may be crimped and/or swaged or other affixing technology to attach the flexible insulator sleeve 260 to the housing 220. The crimp ring 250 may also serve to mechanically position the conductive component including the first terminal 224 and the second terminal 226 relative to the housing 220. The flexible insulator sleeve 260 may include an elastic property that allows the flexible insulator sleeve 260 to be axially stretched. For example, some embodiments provide that the flexible insulator sleeve may include silicone and may be axially stretched by about 50%. Some embodiments provide that the flexible insulator sleeve 260 is about a 30-40 durometer silicone material.

In some embodiments, in the stretched configuration, an elastic tension is applied to the elongated conductor in the direction away from the arrester 50. In such embodiments, the solder connection between the conductive component 244 and the metal terminal 228 may prevent the flexible insulator sleeve 260 from compelling the elongated conductor away from the arrester 50.

Responsive to the current through the solder joint 242 causing the temperature to rise, the solder joint may melt and cause the gas generating structure 222 to generate arc quenching gases. The pressure corresponding to the generated gas may cause the flexible insulating sleeve 260 to move out of the housing 220 and invert outside the housing 220. For example, reference is now made to FIG. 4B, which illustrates that the elongated conductor that includes the first and second terminals 224, 226 is propelled to a position that is nearly outside of the housing 220. In this position, the conduction path therethrough is interrupted.

Figure 4C:
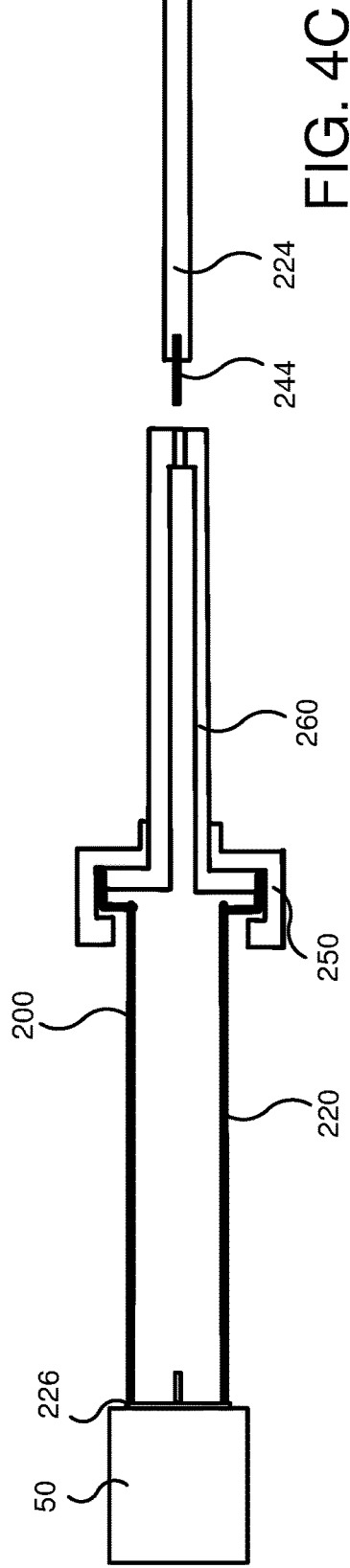

Further, referring to FIG. 4C, the elongated conductor that includes the first and second terminals 224, 226 may be completely separated from the housing 220.

Figure 5C:
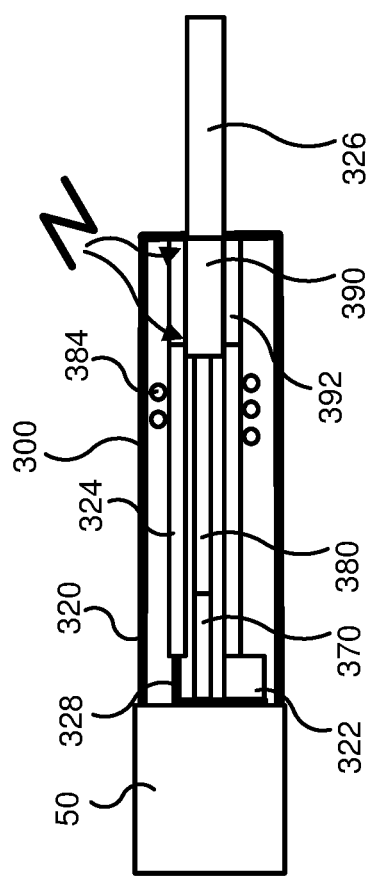

Reference is now made to FIGS. 5A-5D, which are schematic block diagrams illustrating cut-away cross-sectional views of an interrupter device in different respective positions from a conducting and a non-conducting state, respectively, according to some embodiments. Reference is first made to FIG. 5A, which illustrates the device 300 in a conductive state. A chargeless interrupter device 300 may be coupled to an arrester 50. The device 300 may include a housing 320 that defines a cavity therein. The housing 320 may include an insulating material, such as, for example, a thermal set molded housing, among others.

The device 300 may include a metal connector 328 that conductively couples the arrester 50 to the device 300. In some embodiments, a gas generating structure 322 may be provided to generate an arc quenching gas. For example, the metal connector 328 may be attached to a fixed conductor 324 that is not movable within the housing 320 during operation. In some embodiments, the fixed conductor 324 may have an elongated cylindrical diameter that includes inner surfaces therein and that extends within the housing 320. The fixed conductor 324, as well as other conductive components, devices or structures may include copper.

A chargeless disconnection trigger may include an electronic trigger 370 that detects a transient overvoltage condition, or elevated conduction current at the arrester 50 and that triggers a stored energy device 380 to release the energy stored therein. For example, in some embodiments, the stored energy device 380 is a mechanical stored energy device such as a spring or other resilient biasing device.

Some embodiments provide that the chargeless disconnection trigger may replace the fuse as discussed above regarding FIG. 4. In such embodiments, the chargeless disconnection trigger would operate as a release with no stored energy required sicne the stretched silicone would provide the stored energy.

A movable conductor 326 may be arranged to contact the fixed conductor 324 in the conductive state. For example, the movable conductor 326 may be generally cylindrical and contact and fit an inner surface of the fixed conductor 324. In some embodiments, in a conductive state, a portion of the movable conductor 326 may extend beyond a cavity that is defined by the housing 320. The portion that extends may be a terminal stud for connection thereto. When in the conducting state, the movable conductor 326 may be within the cavity of the fixed conductor 324 and/or in contact therewith to provide a conduction path therebetween. In some embodiments, a compression spring 384 provides a compressing force the outside of the fixed conductor 324 to improve the contact between the fixed conductor 324 and the movable conductor 326.

In some embodiments, a fixed insulator 392 may be arranged between the fixed conductor 324 and the end of the housing 320. The fixed insulator 392 may include a cavity that is consistent with and that further continues the cavity defined by the fixed conductor 324. In such embodiments, the fixed conductor 324 and the fixed insulator 392 may extend along the same axis.

A movable insulator 390 may extend between and contact the stored energy device 380 and the movable conductor 326. In this manner, axial force applied to the movable insulator 390 by the stored energy device 380 is applied to the movable conductor 326, thus compelling the movable conductor 326 away from the fixed conductor 324.

Figure 5D:
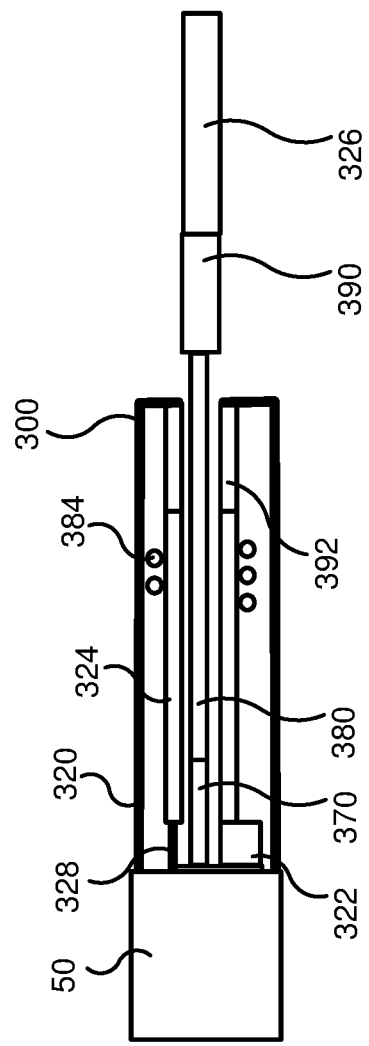

Referring to FIG. 5B, once the electronic trigger 370 detects a transient overvoltage condition at the arrester 50 and that triggers a stored energy device 380 to release the energy stored therein, the movable conductor 326 and the movable insulator 390 are propelled away from the arrester 50. As illustrated, when the movable conductor 326 has just broken contact with the movable conductor, an arc there between may develop. Referring to FIG. 5C, the movable conductor 326 has moved to be proximate the end of the housing 320 and arcing may occur through the movable insulator 390. Referring to FIG. 5D, once the movable conductor 326 is outside the housing 320, the arcing stops and the conductive path is interrupted.

Reference is now made to FIGS. 6A-6D are schematic block diagrams illustrating cut-away cross-sectional views of an interrupter device in different respective positions from a conducting and a non-conducting state, respectively, according to some embodiments. As illustrated, FIGS. 6A-6D include several substantially similar components and structures therein. As such, to avoid redundancy, only distinctive features of FIGS. 6A-6D over FIGS. 5A-5D are further described. The device 400 includes a power transistor 410 that is configured to provide electronic switching functions responsive to detection of a TOV event. Examples of such transistors include power MOSFet devices among others.

In some embodiments, solid-state electronic switching functions may include sensing and disconnecting prior to failure and reconnecting after recovery, among others Further, embodiments may include a communications module 420 that is configured to wirelessly transmit state data corresponding to a state of the device 400. Example states include a conducting state and a non-conducting state. In some embodiments, the communications module 420 may communicate associated time, date, and/or device identification data that corresponds to the state data. Some embodiments provide that data collection may include event records corresponding to the life span of a product.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A device to provide overload protection, the device comprising an interrupter device and a surge arrester arranged in a circuit, wherein the interrupter device comprises:
   a first terminal that is configured to establish an electrical connection to a first terminal of the surge arrester;
   a second terminal that is configured to establish an electrical connection to an electrical power grid conductor; and
   a disconnection trigger that causes an interruption in an electrically conductive path between the second terminal and the first terminal in response to an overvoltage condition at the second terminal, wherein the interruption is caused prior to a short circuit failure of the surge arrester,
   wherein the disconnection trigger comprises a grading component establishing a voltage across a spark gap, and
   wherein the surge arrester comprises an impedance that impedes current flow through the surge arrester in a voltage limiting condition and that uses the interrupter device to interrupt and provide visible separation from the circuit while currents through the surge arrester to a ground connection are less than 1000 Amperes, wherein the visible separation includes a complete visible separation occurring external to a housing of the interrupter device,
   wherein the interrupter device is directly connected to each of the electrical power grid conductor and the surge arrester, and wherein the ground conductor is only directly connected to the surge arrester.

2. The device of claim 1, wherein the surge arrester includes a second terminal that is configured to establish an electrical connection to the ground connection.

3. The device of claim 1, wherein the disconnection trigger comprises:
a first spark gap electrode that includes a first proximal portion that is conductively engaged with the first terminal of the interrupter device and a first distal portion that is opposite the first proximal portion;
a second spark gap electrode that includes a second proximal portion that is conductively engaged with the second terminal of the interrupter device and a second distal portion that is opposite the second proximal portion, wherein the first distal portion and the second distal portion are spaced apart to form the spark gap therebetween; and
a gas generating structure that is configured to generate an arc quenching material.

4. The device of claim 3, wherein the grading component provides increasing electrical impedance responsive to an increase in the rate of change of current therethrough.

5. The device of claim 3, wherein the gas generating structure comprises boric acid and is configured to be arranged around the spark gap and/or the grading component.

6. The device of claim 1, wherein the grading component comprises a fuse link that comprises a NiCr wire inductor that generates an increasing resistance corresponding to an increasing temperature.

7. The device of claim 1, the device further comprising a housing that defines a cavity that is configured to include the disconnection trigger,
wherein the first terminal of the interrupter device comprises a first end of an elongated conductor and the second terminal of the interrupter device comprises a second end of the elongated conductor that is opposite the first terminal, and
wherein the disconnection trigger comprises:
a conductive component that is electrically coupled between the first terminal of the high voltage surge arrester and a solder joint that conductively couples the conductive component to the first terminal of the interrupter device; and
a flexible insulator sleeve that includes a first insulator end that corresponds to the solder joint and that is movable relative to the housing and a second insulator end that is attached to the housing, wherein the first insulator end of the flexible insulator sleeve is attached to the solder joint and the second insulator end of the flexible insulator sleeve is attached to the housing.

8. The interrupter device of claim 7, wherein the disconnection trigger further comprises a gas generating structure that is in the cavity of the housing between the first terminal of a high voltage surge arrester and the first insulator end of the sleeve and is configured to generate an arc quenching material, wherein responsive to pressure corresponding to the gas being generated by the gas generating structure, a disconnecting force is applied to the first insulator end of the flexible insulator sleeve and the first terminal of the interrupter device.

9. The interrupter device of claim 7, wherein responsive to the disconnecting force being applied to the first insulator end of the flexible insulator sleeve, the elongated conductor that includes the first and second terminals is propelled out of the cavity of the housing.

10. The interrupter device of claim 9, wherein the flexible insulator sleeve comprises silicone, and the gas generating structure comprises boric acid.

11. The interrupter device of claim 7, wherein the flexible insulator sleeve comprises an elastic property and applies a biasing force onto the elongated conductor that includes the first and second terminals,
wherein responsive to the solder reaching a melting temperature based on an electrical surge current, the solder is configured to change to a liquid state and release the conductive connection to the first terminal of the interrupter device, and
wherein responsive to the conductive connection being released from the first terminal of the interrupter device, the biasing force of the flexible insulator sleeve is configured to cause the elongated conductor to move to an ejected position that is out of the cavity of the housing.

12. The device of claim 1, wherein the disconnection trigger comprises a chargeless disconnection trigger that causes the interruption in the electrically conductive path between the second terminal and the first terminal in response to an overloading surge arrester condition at the second terminal without an explosive charge.

13. The interrupter device of claim 1, wherein an impedance of the surge arrester limits fault current conducted through the surge arrester.

14. The device of claim 1, wherein currents through the surge arrester to the ground are less than about 10 A.

15. The device of claim 1, wherein the currents through the surge arrester to the ground are less than about 1 A.

16. An interrupter device comprising:
an insulating housing that is elongated and that defines a cavity that includes a first housing end that is adjacent a surge arrester terminal and a second housing end that is opposite the first housing end;
a fixed conductive component that is positioned within the cavity between the first housing end and the second housing end;
a first terminal that is configured to establish an electrical connection to the surge arrester terminal;
a second terminal that is configured to establish an electrical connection to an electrical power grid conductor and that is conductively coupled to the fixed conductive component in a first position and that is not conductively coupled to the fixed conductive component in a second position that is different from the first position; and
a disconnection trigger that causes an interruption in an electrically conductive path between the first terminal and the second terminal in response to an overload condition at the second terminal, wherein the interruption is caused prior to a short circuit failure of the surge arrester,
wherein the interrupter device is configured to interrupt and provide visible separation from the circuit while currents through the surge arrester to a ground connection are less than 1000 Amperes, wherein the visible separation includes a complete visible separation occurring external to a housing of the interrupter device,
wherein the interrupter device is directly connected to each of the electrical power grid conductor and the surge arrester, and wherein the ground conductor is only directly connected to the surge arrester.

17. The device of claim 16, wherein the disconnection trigger, responsive to the overvoltage condition, causes the second terminal to move from the first position to the second position.

18. The device of claim 16, wherein the second terminal is outside the cavity in the second position.

19. The device of claim 16, further comprising:
a fixed insulating sleeve that extends from the fixed conductive component and towards the second housing end and that includes an inner surface that movably contacts an outer surface of the second terminal; and
a movable insulator that contacts an inner surface of the fixed conductive component responsive to the second terminal being in the first position and that contacts an end of the second terminal.

20. The device of claim 19, wherein the movable insulator is outside the cavity of the housing responsive to the second terminal being in the second position.

21. The device of claim 16, wherein the disconnection trigger comprises a gap grading device that is between the fixed conductive component and the surge arrester terminal.

22. The device of claim 21, wherein the disconnection trigger is configured to cause the interruption in the electrically conductive path between the first terminal and the second terminal.

23. The device of claim 21, wherein the disconnection trigger is configured to disconnect the electrically conductive path prior to device failure and reconnect the electrically conductive path after recovery.

24. A device to provide overload protection, the device comprising:
an interrupter device electrically connected to an electrical power grid line voltage conductor;
a surge arrester including a first terminal that is configured to establish a first electrical connection to the interrupter device and a second terminal that is configured to establish a second electrical connection to an electrical power grid ground conductor;
wherein the surge arrester provides voltage limiting impedance,
wherein the interrupter device uses non-linear impedance to cause an interruption of an impeded fault and provide visible separation of a surge arrester circuit, wherein the interruption is caused prior to a short circuit failure of the surge arrester, and
wherein the electrical power grid ground conductor and/or the electrical power grid line voltage conductor are visibly detached from the interrupter device, wherein the visible separation includes a complete visible separation occurring external to a housing of the interrupter device, and wherein the interrupter device is directly connected to each of the electrical power grid conductor and the surge arrester, and wherein the electrical power grid ground conductor is only directly connected to the surge arrester.

* * * * *